July 7, 1936.  C. A. RETTMAN  2,047,155
WIND PROPELLED TRACTOR
Filed Jan. 17, 1935  3 Sheets-Sheet 2
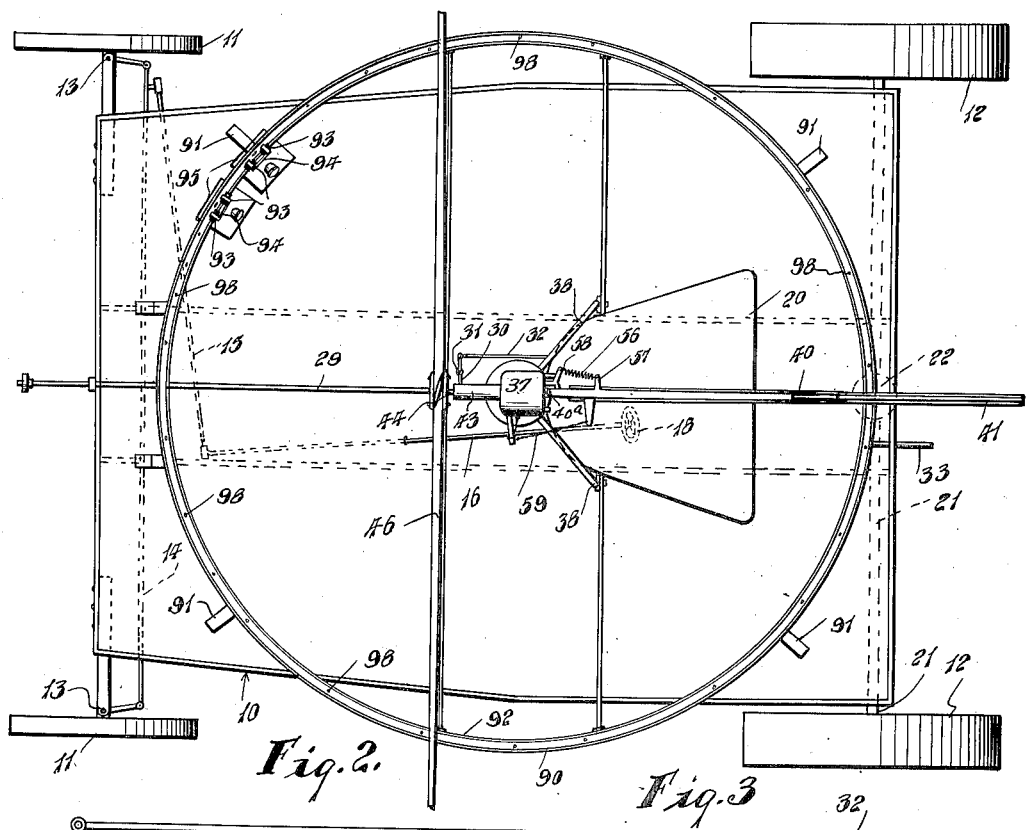
Fig. 2.
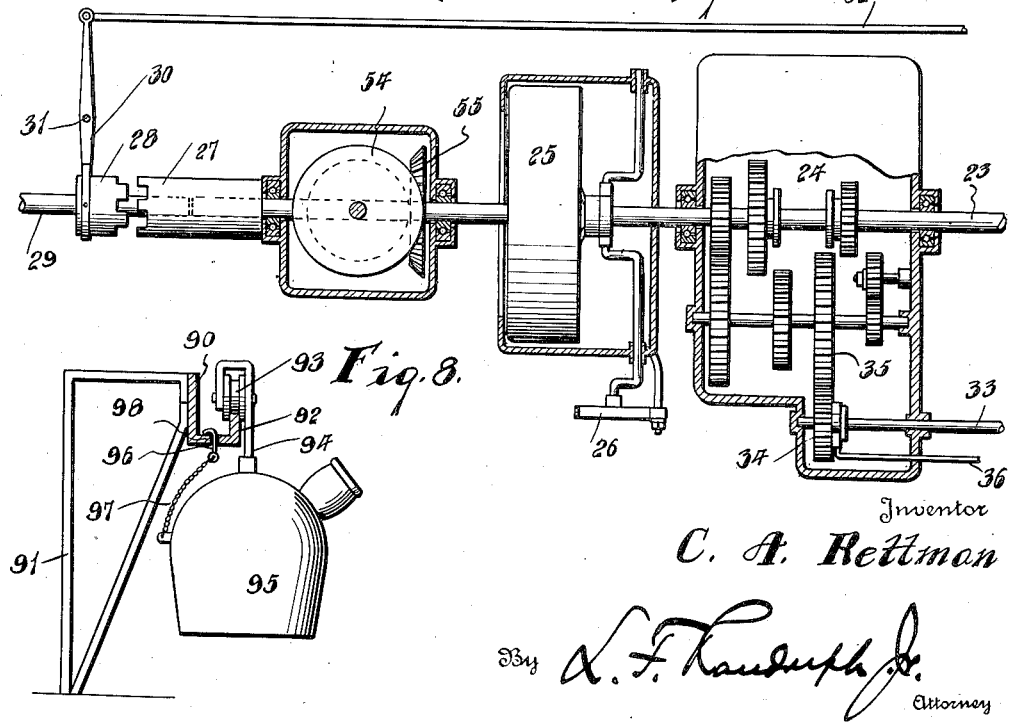
Fig. 3.
Fig. 8.
Inventor
C. A. Rettman
By L. F. Randolph Jr.
Attorney July 7, 1936.  C. A. RETTMAN  2,047,155
WIND PROPELLED TRACTOR
Filed Jan. 17, 1935   3 Sheets-Sheet 3
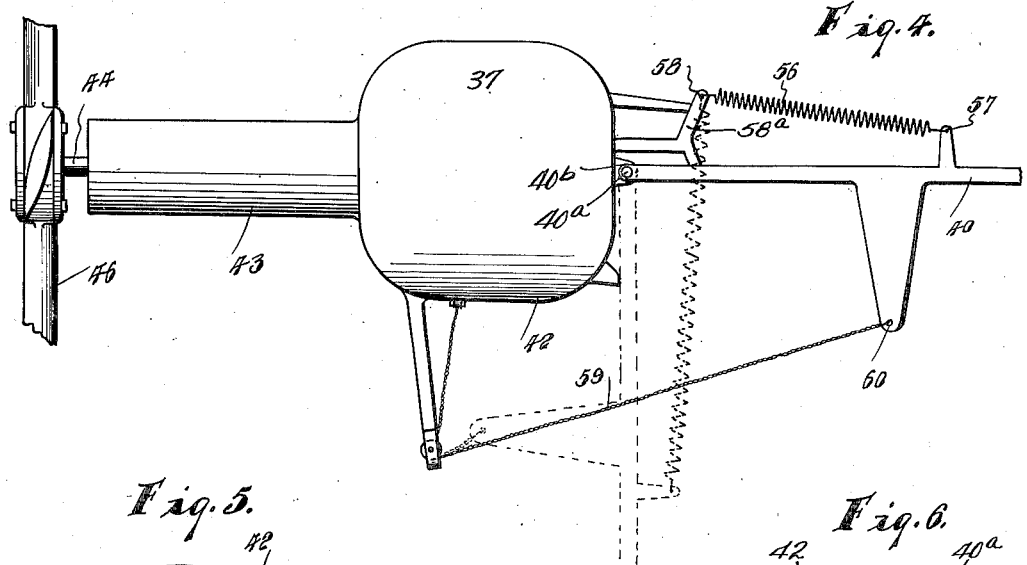
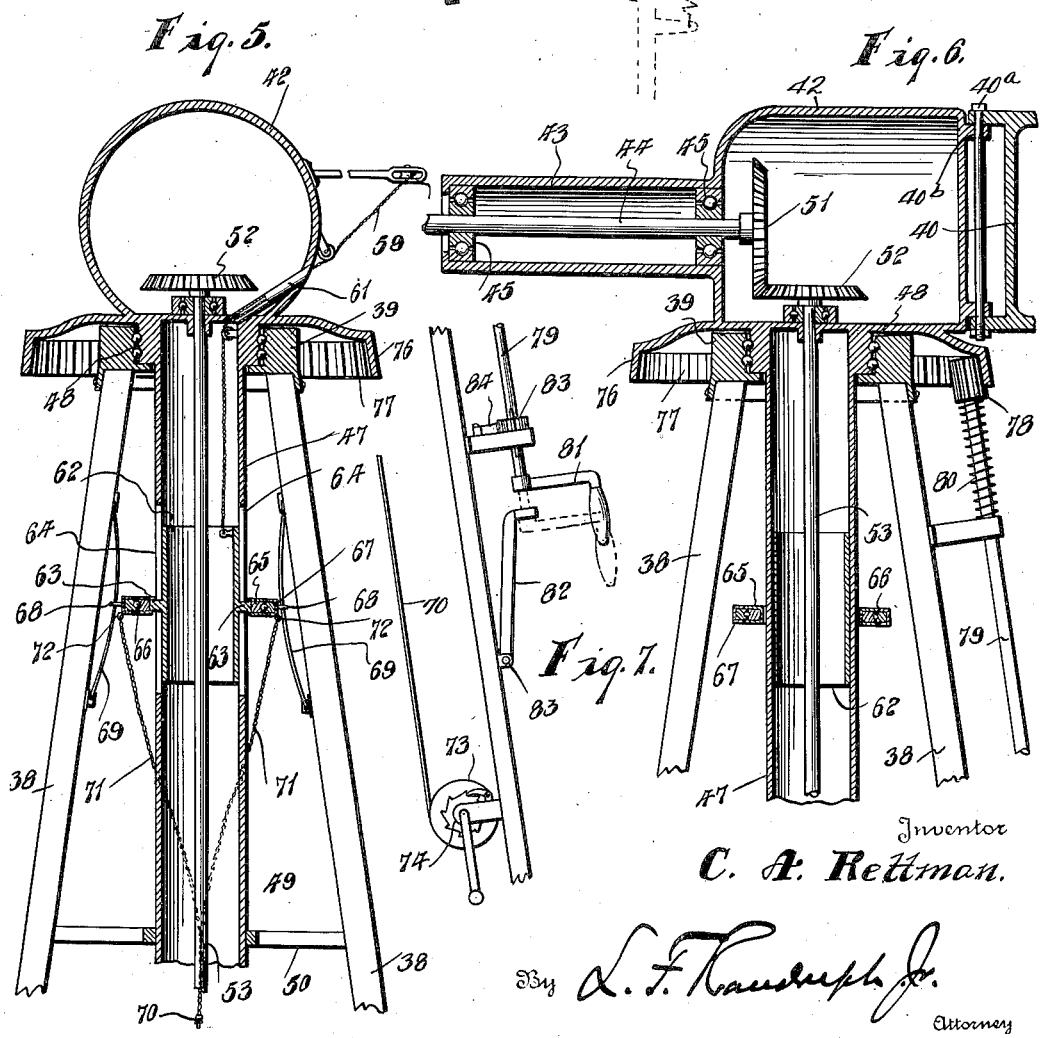
Inventor
C. A. Rettman.
By L. F. Randolph Jr.
Attorney Patented July 7, 1936

2,047,155

UNITED STATES PATENT OFFICE 2,047,155

WIND PROPELLED TRACTOR

Carl A. Rettman, Wichita Falls, Tex.

Application January 17, 1935, Serial No. 2,283

6 Claims. (Cl. 180—2)

This invention relates to a novel mechanism whereby a tractor may be propelled by the force of the wind, both in forward and in rearward directions.

It is particularly aimed to provide novel means wherein a vane mechanism associated with the propeller is capable of fastening at various angles against bodily turning movement, a construction wherein novel weight means are adjustable to balance and stabilize the tractor and a construction having novel means whereby power may be taken off at the front and rear.

The more specific objects and advantages will in part be pointed out and otherwise become apparent from a consideration of the description following taken in connection with accompanying drawings illustrating an operative embodiment.

In said drawings:—

Figure 2 is a plan view thereof;

Figure 3 is an enlarged horizontal sectional view particularly showing the transmission and adjacent parts;

Figure 4 is a partial plane view of the device;

Figure 5 is an enlarged vertical section of the mounting of the propeller frame;

Figure 6 is a central vertical sectional view of the parts of Figure 5, taken at a right angle thereto;

Figure 7 is an enlarged detail side elevation of the mechanism for adjusting and fastening the propeller frame, and Figure 8 is an enlarged vertical section illustrating one of the weights and its mounting.

Figure 1:
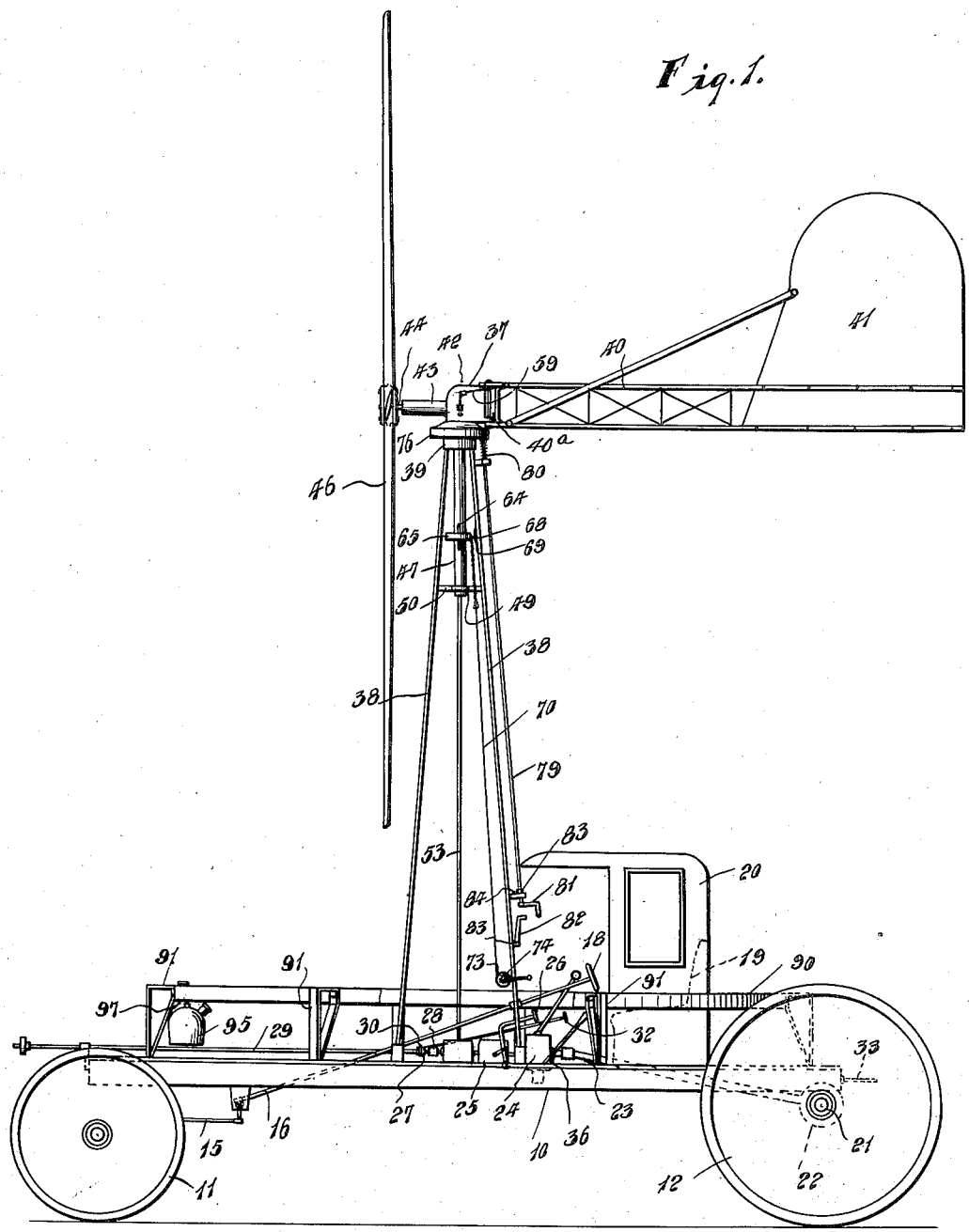
Figure 1 is a view in side elevation of the improved wind-propelled tractor.

Referring specifically to the drawings wherein like reference characters designate like or similar parts, 10 designates a suitable tractor chassis adapted to travel on a pair of front wheels 11, and a pair of rear wheels 12. Said front wheels 11 are mounted by conventional axle means 13 having a steering rod 14 connected therewith with which a link 15 is associated and which is directly operated by a steering post 16 having a steering wheel 18 which is operable by the driver from his seat as at 19 within a cab 20 mounted on the chassis 10. Obviously any desired means may be employed for mounting the wheels 11 and steering them.

The rear wheels 12 are positively driven by axle means 21 including a conventional differential 22, driven from a propeller shaft 23. Obviously the drive of the wheels 12 also may be of any desired construction and is but conventionally shown.

Associated with said propeller shaft 23, is a transmission 24 of conventional form, preferably having three forward speeds and one reverse speed as usual. Also, associated with said propeller shaft 23 is a conventional clutch mechanism at 25 under usual pedal or other control at 26.

The forward end of the propeller shaft 23 has a clutch section 27 engageable by a coacting clutch section 28, splined on a power take-off shaft 29 located at the front of the vehicle. Clutch section 28 is slidable and is engaged by a yoke 30 in the form of a lever pivoted as at 31 and operable by a control rod 32 from the seat 19. Another power take-off shaft is provided as at 33 terminating at the rear of the machine, such shaft having a gear 34 slidably splined thereon so that it may be in mesh with one of the forward drive gears 35 of the transmission 24. Such gear 34 may be slid into and out of mesh with the gear 35 through operation of appropriate linkage 36, preferably under control from the driver's seat 19.

It will be understood that the power take-off shafts 29 and 33, may be used to drive any desired element or machinery and that any suitable means may be used for arranging the element or machinery in driving relation with the shafts.

The tractor is adapted to be driven by a novel wind motor generally indicated at 37. To accommodate such motor 37, a tower is built on the chassis 10 consisting, for instance, of three or more poles or structural members 38, being closer together at the top than at the bottom. Said poles 38 are capped by a plate or ring 39.

Said motor 37 has an elongated farme 40 provided with an upwardly extending weather vane 41 at the rear portion thereof. The forward portion of said frame is pivoted on a vertical axis as by means of bolt 40$^a$ attached to ears 40$^b$ on a hollow section 42 of the motor casing, at the forward end of which a reduced bearing section 43 extends. A shaft 44 is journaled in bearings 45 of any suitable type, within the portion 43, which is carried and is driven by any suitable form of wind-operated propeller 46.

Depending from the section 42 is a tubular journal 47 which is rotatably mounted in the upper end of the tower by means of bearings at 48 and a ring bearing at 49 supported by a brace or spider 50.

Said shaft 44 has a bevel gear 51 keyed thereon which meshes with a bevel gear 52 carried by a vertical shaft 53, suitably journaled within the journal 47, and which has a bevel gear 54 at its lower end enmeshed with a level gear 55 keyed on the propeller shaft 24, so that the motion imparted by the wind to the propeller 46 will serve to drive the propeller shaft 24.

The weather vane 41 is adapted to point into the wind in order to obtain maximum driving of the propeller 46. A contractile spring 56 is connected to the frame 40 at 57 and to the bracket 58a on the casing of a motor 37 at 58 (Figures 2 and 4), normally maintaining the vane 41 in abutment with bracket 58a pointed in the wind, in a straight ahead position and directly over and in parallelism to the longitudinal axis of the chassis 10.

Means are provided whereby the frame 40 and vane 41 may be pointed in the wind and to this end, a flexible element 59 is fastened to the frame 40 at 60, such element being suitably guided as at 61 into the interior of journal 47 and there being connected to a tubular slide 62. Guides 63 extend from said slide through elongated slots 64 and are connected to the inner race member 65 of a ball bearing ring construction completed by balls 66 and an outer race member 67. Said ball bearing 66 and race members 65 and 67 enable the journal 47 and members carried thereby to rotate. The outer race member has eyelets 68, through which short, somewhat loose cables 69 pass, which cables are anchored at opposite ends to poles of the tower. A flexible draw element 70 has branches 71 fastened at 72 to the outer race member 67, the draw member 70 being wound about a drum 73, located adjacent the driver's seat 19, fastened to the tower, and operable by pawl and ratchet mechanism 74. The winding of the cable 70, it will be realized, moves the arm 40 against the tension of the spring 56, since cable 70 and its branches 71, move the slide 62 downwardly and accordingly moves the cable 59 downwardly which operates the vane 41 against the tension of spring 56.

In the event it is desired to secure the motor in any desired angle in fixed relation to the tractor, as when maximum speed of the propeller 46 is not desired, especially for power take-off purposes, a clutch member 76 is formed on the section 42, having interior clutch teeth at 77 which are adapted to be engaged by clutch teeth 78 provided on a slidable, and rotatable rod 79, normally urged into clutching position through the expansion of a spring 80. Said rod 79 has an operating crank 81 thereon engageable by a fork 82, pivoted at 83 to the tower, the fork being engageable with the crank in lowermost position of the rod 79 to maintain the clutch teeth 78 and 77 out of engagement. Turning of the rod 79 is overcome by means of a ratchet 83, through which the rod is slidable, and with which a pawl 84 coacts.

With the clutch 78 disengaged from the part 77, it will be realized that the chain or cable 70 may be pulled downwardly which will effect rotation of the arm 40 to the dotted line position suggested in Figure 4. The motor and propeller may thus be fastened in any desired position. However, with the motor and propeller in a fixed position, held by the clutch 78 engaging part 77, and it is desired to vary the angle of the arm 40 and weather vane, the cable 70 may again be pulled downwardly through the winding of the drum 73, which will effect the adjustment of arm 40 to a desired angle with respect to the motor.

A raised annular track 90 is suitably supported by frame elements 91 on the chassis 10, such track has a flange 92, on which rollers 93 travel carried by brackets 94 which mount weights 95. Such weights have hooks 96 tethered thereto by chains 97, and which hooks are engageable in series of openings 98 provided in the track member 90, to secure the one or more weights provided in any desired position. Said weights may be of any suitable size or material, for instance, being hollow and being filled with concrete. Although only two weights are shown, any desired number may be employed. The operator of the vehicle moves the weights individually on the track, placing them on the side toward the wind. This causes a more even distribution of the weight upon the wheels at the front and the rear of the machine. Pressure of the wind against the entire machine tends to change the balance of pressure of each wheel against the ground. By properly moving the weights, they tend to balance the machine.

Various changes may be resorted to provided they fall within the spirit and scope of the invention.

I claim as my invention:—

1. A machine of the class described comprising a wheeled chassis, a tower on said chassis, a wind motor mechanism mounted on said tower, transmission mechanism for propelling the wheeled chassis operated by said wind motor, weight means on the chassis adjustable to balance the load imposed on the wheels, said weight means having an annular track surrounding said tower, and the weight means comprising weight elements having rollers movable on the track, and hook elements engageable with a series of openings in the track.

2. A device of the class described having a wheeled chassis, a frame, a tower on said chassis, said frame being on said tower, a vane carried by the frame serving to point the frame in the wind, a casing journaled on the tower and to which said frame is pivoted, a shaft journaled on the casing, a propeller on the shaft to be driven by the wind, gearing driven from said shaft to propel the wheeled chassis, spring means urging the frame and vane to a position substantially parallel to the longitudinal axis of the wheeled chassis, and means operable to move said frame counter to said spring means.

3. A device of the class described having a wheeled chassis, a frame, a tower on said chassis, said frame being on said tower, a vane carried by the frame serving to point the frame in the wind, a casing journaled on the tower and to which said frame is pivoted, a shaft journaled on the casing, a propeller on the shaft to be driven by the wind, gearing driven from said shaft to propel the wheeled chassis, spring means urging the frame and vane to a position substantially parallel to the longitudinal axis of the wheeled chassis, means operable to move said frame counter to said spring means, and means operable to secure said casing immovably at different angles.

4. A device of the class described having a wheeled chassis, a frame, a tower on said chassis, said frame being on said tower, a vane carried by the frame serving to point the frame in the wind, a casing journaled on the tower and to which said frame is pivoted, a shaft journaled on the casing, a propeller on the shaft to be driven by the wind, gearing driven from said shaft to propel the wheeled chassis, spring means urging the frame and vane to a position substantially parallel to the longitudinal axis of the wheeled chassis, means operable to move said frame counter to said spring means comprising a draw element, a journal depending from the casing, a slide in the journal connected to the draw element, ball bearing means having an inner race to which said slide is connected through slots in the journal and an outer race supported from the inner race, flexible guide elements engaged by the said outer race of the ball bearing means, said flexible guide elements being attached to the tower and the engagement between the flexible guide elements and the outer race permitting up and down motion of the slide, a draw element connected to said outer race, and means operable to wind said last-mentioned draw element.

5. A device of the class described having a wheeled chassis, a frame, a tower on said chassis, said frame being on said tower, a vane carried by the frame serving to point the frame in the wind, a casing journaled on the tower and to which said frame is pivoted, a shaft journaled on the casing, a propeller on the shaft to be driven by the wind, gearing driven from said shaft to propel the wheeled chassis, spring means urging the frame and vane to a position substantially parallel to the longitudinal axis of the wheeled chassis, means operable to move said frame counter to said spring means, comprising a draw element, a journal depending from the casing, a slide in the journal connected to the draw element, ball bearing means having an inner race to which said slide is connected through slots in the journal and an outer race supported from the inner race, flexible guide elements engaged by the said outer race, said flexible guide elements being attached to the tower and the engagement between the flexible guide elements and the outer race permitting up and down motion of the slide, a draw element connected to said outer race, and normally disengaged clutch means for said frame to maintain the same immovable at different angles.

6. A machine of the class described comprising a wheeled chassis, a tower on said chassis, a wind motor mechanism journaled on said tower on a perpendicular axis, transmission mechanism for propelling the wheeled chassis operated by said wind motor mechanism, a vane operable to point the wind motor mechanism into the wind, and means operable to secure the wind motor at different angles relatively to the chassis.

CARL A. RETTMAN.